United States Patent
Pascal et al.

(10) Patent No.: US 12,134,464 B2
(45) Date of Patent: Nov. 5, 2024

(54) UPLOCK PROVIDED WITH RETENTION DETECTION MEANS

(71) Applicant: SAFRAN LANDING SYSTEMS, Velizy-Villacoublay (FR)

(72) Inventors: Vincent Pascal, Moissy-Cramayel (FR); Ludovic Dufay, Moissy-Cramayel (FR); Michel Arbentz, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 17/768,899

(22) PCT Filed: Oct. 15, 2020

(86) PCT No.: PCT/EP2020/079135
§ 371 (c)(1),
(2) Date: Apr. 14, 2022

(87) PCT Pub. No.: WO2021/074349
PCT Pub. Date: Apr. 22, 2021

(65) Prior Publication Data
US 2024/0101249 A1    Mar. 28, 2024

(30) Foreign Application Priority Data

Oct. 17, 2019   (FR) ........................ 1911648

(51) Int. Cl.
*B64C 25/28*    (2006.01)
*B64D 45/00*    (2006.01)

(52) U.S. Cl.
CPC .......... *B64C 25/28* (2013.01); *B64D 45/0005* (2013.01)

(58) Field of Classification Search
CPC ..................................... B64C 25/28
See application file for complete search history.

(56) References Cited

FOREIGN PATENT DOCUMENTS

| EP | 1 342 663 A1 | 9/2003 | |
|---|---|---|---|
| WO | WO-2005005252 A1 * | 1/2005 | ............. B64C 25/26 |
| WO | WO-2018189299 A1 * | 10/2018 | ........... B64C 23/072 |

OTHER PUBLICATIONS

International Search Report for PCT/EP2020/079135 dated Jan. 22, 2021 (PCT/ISA/210).

* cited by examiner

*Primary Examiner* — Vicky A Johnson
(74) *Attorney, Agent, or Firm* — Sughrue Mion, PLLC

(57) ABSTRACT

An uplock for selectively retaining a capture pin of a movable element including a hook, a locking member, and a detector. The hook is movable between a release position and a retaining position. The locking member is movable between a locked position that immobilizes the hook and an unlocked position in which the hook is free. The detector detects whether the hook is in the retaining position and the capture pin is present in the hook. The detector includes a sensor associated with a single target which is movable between two positions The sensor emits a signal which is modified when the target passes from one of the positions to the other. The target is independently in kinematic interaction with the hook and the capture pin.

8 Claims, 2 Drawing Sheets

UPLOCK PROVIDED WITH RETENTION DETECTION MEANS

CROSS REFERENCE TO RELATED APPLICATIONS

This application is a National Stage of International Application No. PCT/EP2020/079135 filed Oct. 15, 2020, claiming priority based on French Patent Application No. 1911648 filed Oct. 17, 2019, the entire contents of each of which are herein incorporated by reference in their entireties.

The invention relates to an uplock such as those used in aircraft for retaining landing gear of the aircraft in the retracted position or for retaining cargo hold doors, and more generally for retaining any movable element of the aircraft in one of these positions.

BACKGROUND OF THE INVENTION

In a manner which is known per se, an uplock of this type comprises a hook which is pivotally mounted on the uplock between a retaining position and a release position, and a member for locking the hook which is urged into a position for locking the hook when the latter is brought into the retaining position, and which can be moved towards an unlocked position in order to enable the hook to swing towards the release position and thus release the movable element.

The hook co-operates with a capture pin of the movable element which, when the element arrives at the position in which it is to be retained, pushes the hook into the retaining position in which the hook is automatically locked by the locking member. The capture pin of the movable element is then trapped in the hook and cannot be released therefrom. To enable the movable element to be released, the locking member has to be pushed back into the unlocked position, for example by means of an unlocking actuator. The movable element is then free to leave the position in which it was retained; the capture pin drives the hook from the retaining position towards the release position.

The uplock is usually provided with a proximity sensor to detect the position of the locking member. To this end, the locking member is equipped with a target which is movable between a position that is remote from the proximity sensor and a position that is proximate to the proximity sensor, each position of the target being associated with one of the positions of the locking member, so that the electrical signal generated by the proximity sensor changes when the locking member passes from the unlocked position to the locked position and vice versa. Detecting the locking member in the locked position means that the capture pin has pushed the hook into the retaining position in which it is automatically locked, so that this detection also corresponds to an indirect detection of retention of the movable element.

However, on occasion, the hook has been correctly detected in its retaining position, but in fact the capture pin has not been retained by the hook because part of the hook has broken, preventing it from retaining the capture pin. Under these exceptional circumstances, detection of the hook in the retaining position does not guarantee that the movable element has in fact been retained.

The document WO-A-2018/189299 proposes providing the casing with a second proximity sensor to detect whether the capture pin is in fact present in the hook when the latter is in its retaining position. To this end, a second target is carried by an indicator lever which is pushed back by the capture pin itself and which places the second target in a position remote from the sensor if the capture pin is not in the hook and in a position proximate to the second sensor if the capture pin is in the hook in the retaining position. Thus, the movable element will be considered to be effectively retained if the first sensor indicates that the locking member is in the locked position and if the second sensor indicates that the capture pin is in fact present in the hook. This arrangement necessarily involves the more complex use of two sensors, and necessitates making a logical combination of two signals.

The same document has also proposed the use of only a single proximity sensor, by placing it on the uplock so that it is capable of detecting the simultaneous presence in the vicinity of two targets respectively connected to the locking member and to the indicator lever, the two targets only approaching the proximity sensor when the hook is in the retaining position and if the capture pin is present in the hook. The simultaneous detection of several proximate targets by the same sensor is, however, difficult to control and can generate false detections.

OBJECTIVE OF THE INVENTION

The objective of the invention is to propose an uplock that makes it possible to detect the hook in the retaining position and the capture pin present in the hook in a reliable manner, without the need for digital processing or delicate multi-target control.

SUMMARY OF THE INVENTION

In order to achieve this objective, an uplock for selectively retaining a movable element is proposed, the uplock comprising:
  a hook which is movable between a release position and a position for retaining a capture pin of the movable element;
  a locking member interacting with the hook and movable between a locked position in which it immobilizes the hook in the retaining position and an unlocked position in which the hook is free to be displaced under the force of the capture pin of the movable element;
  detection means adapted to detect a situation in which the hook is in the retaining position and the capture pin is present in the hook.

According to the invention, the detection means comprise a sensor associated with a single target which is movable between two positions so that the sensor emits a signal which is modified when the target passes from one of the positions to the other, the target being in kinematic interaction with the hook and the capture pin so that the target is held in one of its positions and can only reach the other position if the hook is in the retaining position and the capture pin is in fact present in the hook.

When it is indicated that two elements are in kinematic interaction, it should be understood here to mean that the movement of one element causes the movement of the other element, either directly or via one or more intermediate elements. Thus, in accordance with the provisions of the invention, the sensor signal is only modified if the single target changes its position, which can only occur if the two desired conditions, namely the hook in its retaining position and the capture pin present in the hook, are met simultaneously. According to the invention, therefore, a logical and mechanical function is implemented, which has the advantage of using only one target and does not require any digital processing.

According to a preferred embodiment of the invention, the uplock comprises an indicator lever which interacts with the capture pin and which is movable between a first position indicating the absence of the capture pin in the hook and a second position indicating the presence of the capture pin in the hook, the target only being able to move towards the other of its positions if the locking member is in the locked position and the indicator lever is in the second position indicating the presence of the capture pin in the hook.

Thus, the target is in indirect kinematic interaction with the hook and the capture pin by means of the locking member and the indicator lever, which is easier to organize than a direct interaction between the hook and the capture pin.

Preferably again, the target is carried by a movable support in a manner such that the indicator lever, the locking member and the movable support are pivotally mounted about the same pivot axis. Advantageously, the movable support comprises a bearing surface which cooperates with respective bearing surfaces of the locking member and of the indicator lever.

BRIEF DESCRIPTION OF THE DRAWINGS

The invention will be better understood in the light of the following detailed description of a particular embodiment of the invention, made with reference to the accompanying drawings, in which.

DETAILED DESCRIPTION OF THE INVENTION

Figure 1:
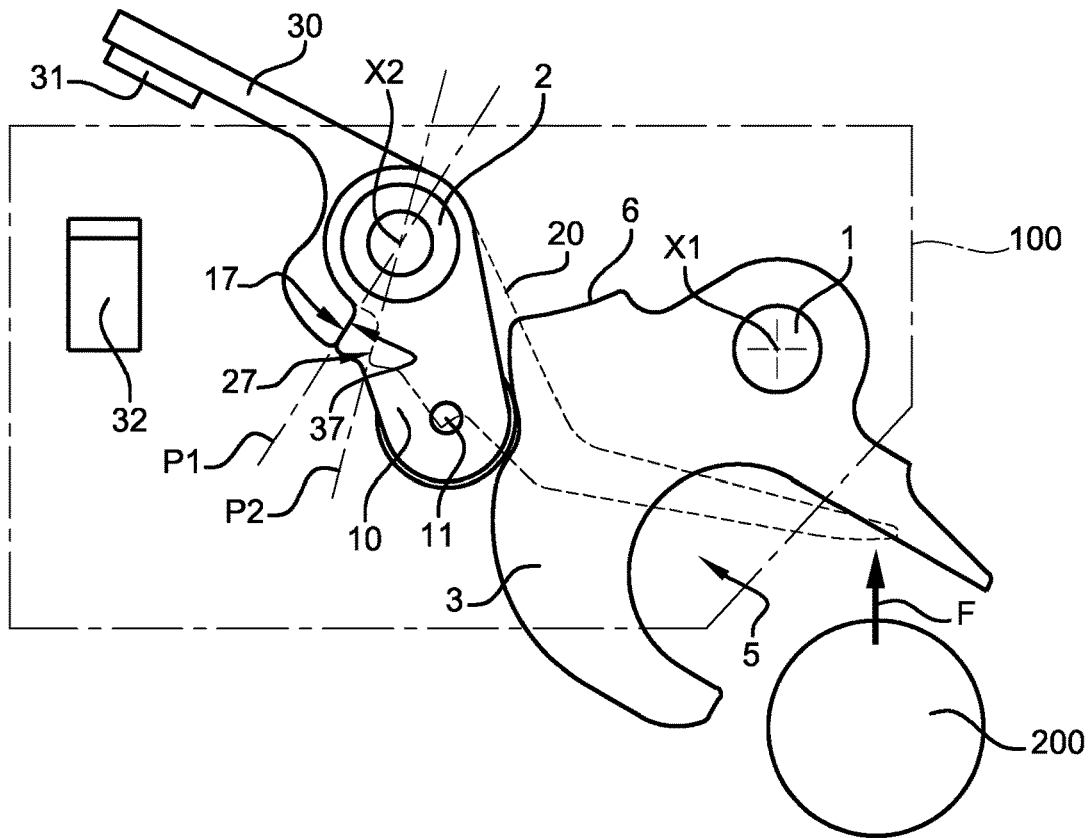
FIG. 1 is a diagrammatic front view of an uplock according to a particular embodiment of the invention, illustrated while the hook is in the release position, the capture pin of the movable element approaching the hook, the indicator lever being shown in see-through view and delimited by dashed lines for greater clarity.

With reference to the figures, the uplock of the invention comprises a plate 100 carrying a first pivot 1 and a second pivot 2, defining parallel pivot axes X1 and X2. A hook 3 is mounted on the first pivot 1 about the axis X1 so as to pivot between a release position illustrated in FIG. 1, towards which it is urged by a spring (not shown), and a retaining position illustrated in FIGS. 2 and 3. The hook 3 comprises a hooking portion 5 in which a capture pin 200 of a movable element (for example, aircraft landing gear or a cargo hold door) is intended to be retained by the uplock in order to immobilize the movable element (for example in the retracted position for the landing gear, or in the proximated position for the cargo hold door). To this end, the movable element is displaced by a manoeuvring actuator and the capture pin 200 follows the trajectory F, forcing the hook 3 towards the locked position in which it retains the capture pin 200. For this purpose, a locking member 10 is pivotally mounted on the second pivot 2 about the axis X2 and comprises a roller 11 which permanently bears on a cam profile 6 of the hook 3. The locking member 10 pivots between an unlocked position illustrated in FIG. 1 and a locked position illustrated in FIGS. 2 and 3, into which it is returned automatically by a spring (not shown) and which it reaches automatically when the hook 3 arrives in the retaining position. In the locked position, the locking member 10 locks the hook 3 in the retaining position. To release the capture pin 200, an unlocking actuator (not shown) urges the locking member 10 towards the unlocked position, which enables the hook 3 to pivot towards the release position, and therefore enables the capture pin 200 to leave the hook 3.

Figure 2:
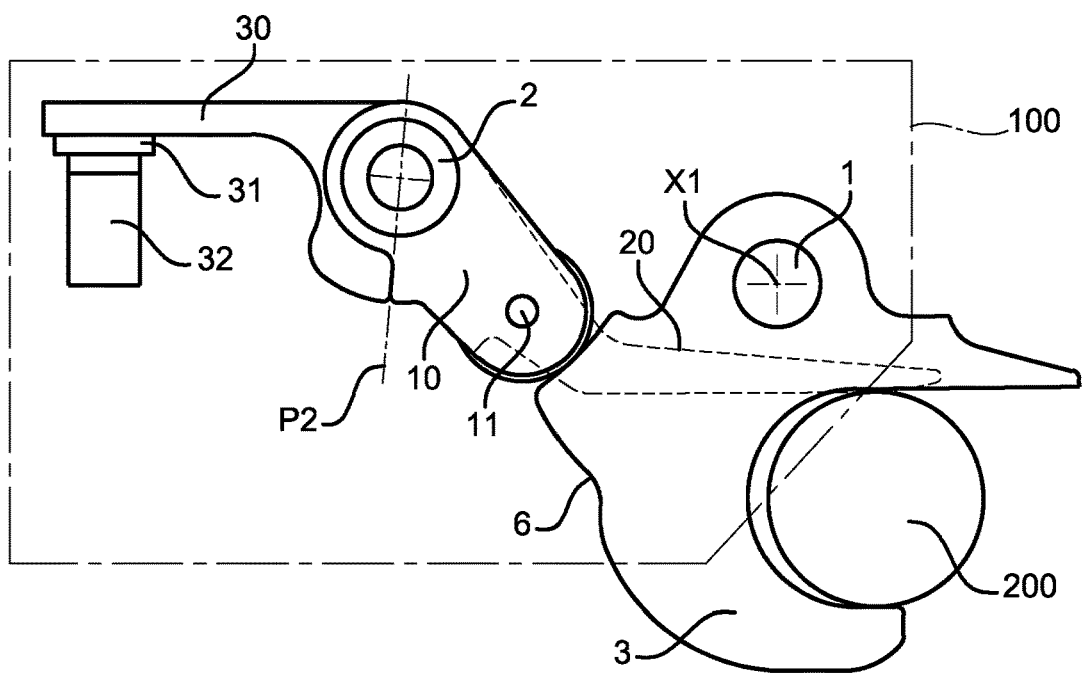
FIG. 2 is an analogous view to that of FIG. 1, illustrating the hook in the locked position while the capture pin is in fact retained by the hook.
Figure 3:
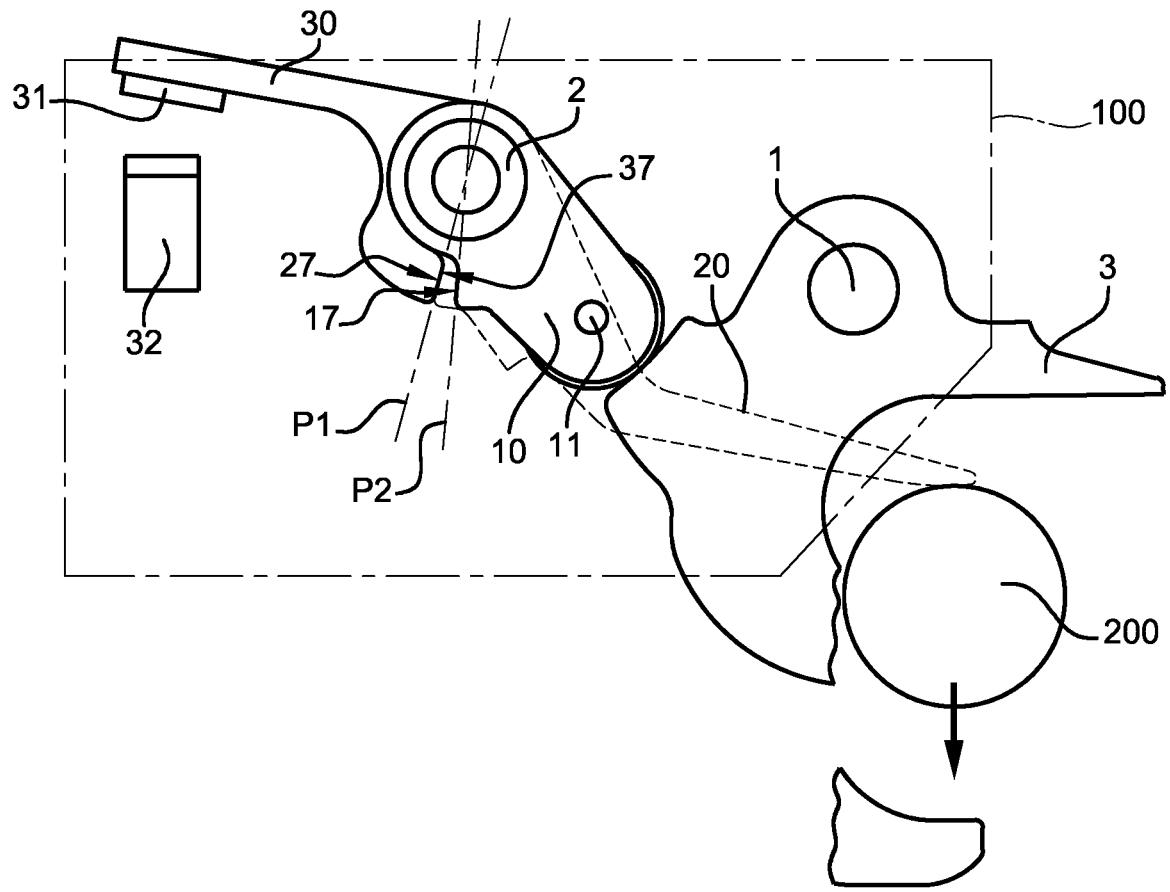
FIG. 3 is an analogous view to that of FIG. 1, illustrating the hook in the locked position while the capture pin has been released from the hook following breakage of a portion thereof.

The uplock further comprises an indicator lever 20, which is also pivotally mounted on the second pivot 2 about the axis X2, and movable between a position indicating the presence of the capture pin 200 in the hook 3, illustrated in FIG. 2, into which it is pushed by the capture pin 200 when the latter approaches the hook 3, and a position indicating the absence of the capture pin 200 in the hook 3, illustrated in FIGS. 1 and 3, towards which the indicator lever 20 is urged by a spring (not shown).

Finally, the uplock comprises a movable support 30 which is also pivotally mounted on the second pivot 2 about the axis X2. The movable support carries a target 31 which is therefore movable between a position that is remote from a proximity sensor 32 carried by the plate 100, as shown in FIGS. 1 and 3, and a position that is proximate to the proximity sensor 32, as shown in FIG. 2, and towards which the target 31 is urged by a spring (not shown). The proximity sensor 32 produces an electrical signal the characteristics of which change when the target 31 passes from one position to the other, thereby making it possible to distinguish between the two positions of the target 31.

Figure 4:
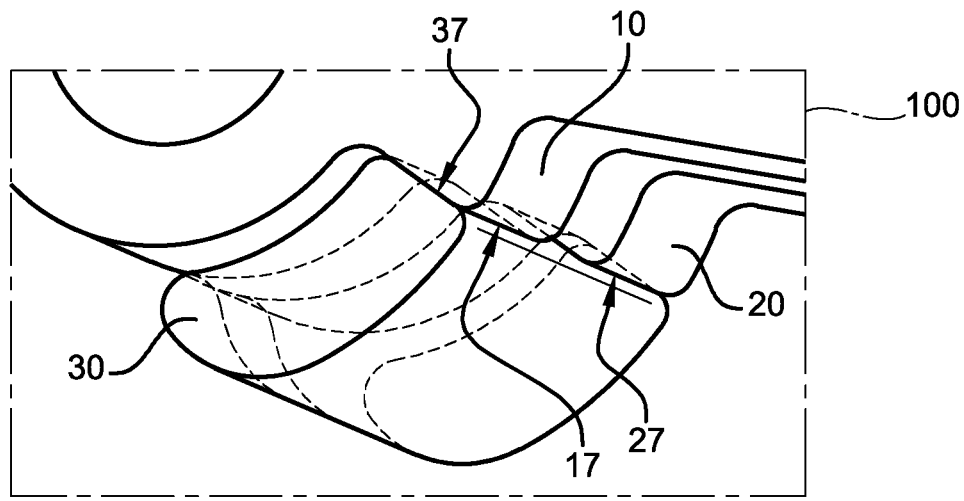
FIG. 4 is a partial perspective view at the pivot articulating the locking member, the indicator lever and the movable support, showing their respective bearing surfaces.

As can be seen more clearly in FIG. 4, the movable support 30 has an abutment surface 37 which is intended to interact mechanically with facing abutment surfaces, namely an abutment surface 17 formed on the locking member 10, and an abutment surface 27 formed on the indicator lever 20. In the situations illustrated in FIGS. 1 and 3, the abutment surface 37 of the movable support 30 is maintained in an angular position P1 (corresponding to the remote position of the target 31) by at least one of the other abutment surfaces 17, 27 of the locking member 10 or of the indicator lever 20, while it is free to come into the angular position P2 (corresponding to the proximate position of the target 31) in the situation illustrated in FIG. 2.

The uplock of the invention functions as follows. The initial situation is illustrated in FIG. 1 where the hook 3 is in the release position, the locking member 10 is in the unlocked position and the indicator lever 20 is in its position indicating that there is no capture pin in the hook 3. In this position, the abutment surfaces 17 and 27 of the locking member 10 and of the indicator lever 20 are in the angular position P1 and cooperate with the abutment surface 37 of the movable support 30 in order to keep the target in the remote position of the proximity sensor 32. The movable element is then operated in order to approach its immobilization position. The capture pin 200 then moves in the direction F and pushes the hook 3 towards the retaining position and the indicator lever 20 towards the position indicating the presence of the capture pin 200 in the hook 3. When the hook 3 reaches the retaining position, the locking member 10 automatically moves into the locked position in order to lock the hook 3 in the retaining position. In this position illustrated in FIG. 2, the abutment surfaces 17, 27 of the locking member 10 and of the indicator lever 20 are in the angular position P2, which enables the movable support to pivot until the abutment surface 37 is in the angular position P2, in a manner such that the target 31 is proximate to the proximity sensor 32 the signal from which changes, indicating that the capture pin has been correctly retained by the hook 3.

In the event that the hook 3 breaks and no longer retains the capture pin 200, as illustrated in FIG. 3, the capture pin 200 can leave the hook 3 (for example under the effect of gravity) while the latter is still immobilized in the retaining position. In so doing, the indicator lever 20 is returned under the effect of its return spring to the position indicating the absence of a capture pin in the hook, in a manner such that its abutment surface 27 is returned to the angular position P1, pushing the abutment surface 37 of the movable support 30 back in a manner such that the target 31 returns to the position remote from the proximity sensor 32. The signal from the latter changes, indicating that the capture pin 200 is no longer retained by the hook 3 even though the latter remains immobilized in the retaining position.

Thus, and according to an essential feature of the invention, the target 31 can only reach the position proximate to the proximity sensor 32 if, simultaneously, the hook 3 is locked in the retaining position and the capture pin 200 is in fact present in the hook. The provisions of the invention make it possible to implement a logic function AND a mechanical function, requiring the use of only one target and one sensor.

The invention is not limited to what has just been described, but in contrast encompasses any variation which falls within the scope defined by the claims.

In particular, although the locking member 10, the indicator lever 20 and the movable support 30 here are all pivotally mounted on the same pivot, which facilitates their cooperation via the abutment surfaces, this configuration is not indispensable, and any other configuration which enables the movable support to move only if the hook is in the retaining position and the capture pin in the hook is conceivable within the scope of the invention. For example, the movable support may be mounted on a separate pivot, or slidably mounted on the uplock, being held in one of its positions by cams carried by the locking member and the indicator lever, the cams moving aside when the locking member and the indicator lever have pivoted.

Although the movable support here is in kinematic interaction with the hook indirectly via the locking member, and in kinematic interaction with the capture pin indirectly via the indicator lever, the movable support could be operated directly by the hook and/or the capture pin so as to be in direct kinematic interaction with them.

Finally, although the uplock described uses a proximity sensor which cooperates with a proximate or remote target, it is possible to use other detection technologies, for example a Hall effect sensor or an optical sensor.

The invention claimed is:

1. An uplock for selectively retaining a capture pin of a movable element, the uplock comprising:
    a hook which is movable between a release position and a position for retaining the capture pin of the movable element;
    a locking member which is movable between a locked position in which the locking member immobilizes the hook in the retaining position and an unlocked position in which the hook is free to be displaced under the force of the capture pin of the movable element;
    detection means adapted to detect a situation in which the hook is in the retaining position and the capture pin is present in the hook,
    the detection means comprising:
    an indicator lever interacting kinematically with the capture pin and movable between a first position indicating the absence of the capture pin in the hook and a second position indicating the presence of the capture pin in the hook; and
    a sensor associated with a single target which is movable between two positions so that the sensor emits a signal which is modified when the target passes from one of the positions to the other,
    wherein the target is carried by a movable support in kinematic interaction with the locking member and the indicator lever so that the target is held in one of its positions and can only reach and remain in the other of its positions if the locking member is in the locked position and the indicator lever is in the second position indicating the presence of the capture pin in the hook.

2. The uplock as claimed in claim 1, wherein the indicator lever, the locking member and the movable support are pivotally mounted about a same pivot axis.

3. The uplock as claimed in claim 2, wherein the kinematic interaction between the movable support and the locking member and the indicator lever is achieved by a bearing surface of the movable support cooperating with respective bearing surfaces of the locking member and of the indicator lever.

4. The uplock as claimed in claim 3, wherein the bearing surface of the movable support is held in a first angular position by either of the respective bearing surfaces of the locking member and of the indicator lever when the hook is not locked or the indicator lever is in the first position indicating the absence of the capture pin in the hook, and can only reach a second angular position if the hook is locked and the indicator lever is in the second position indicating the presence of the capture pin in the hook.

5. An uplock for selectively retaining a capture pin of a movable element, the uplock comprising:
    a hook which is movable between a release position and a position for retaining the capture pin of the movable element;
    a locking member which is movable between a locked position in which the locking member immobilizes the hook in the retaining position and an unlocked position in which the hook is free to be displaced under the force of the capture pin of the movable element;
    an indicator lever interacting kinematically with the capture pin and movable between a first position indicating the absence of the capture pin in the hook and a second position indicating the presence of the capture pin in the hook; and
    a sensor associated with a single target which is movable between two positions so that the sensor emits a signal which is modified when the target passes from one of the two positions to the other of the two positions,
    wherein the target is carried by a movable support in kinematic interaction with the locking member and the indicator lever so that the target is held in one of the two positions and can only reach and remain in the other of the two positions if the locking member is in the locked position and the indicator lever is in the second position indicating the presence of the capture pin in the hook.

6. The uplock as claimed in claim 5, wherein the indicator lever, the locking member and the movable support are pivotally mounted about a same pivot axis.

7. The uplock as claimed in claim 6, wherein the kinematic interaction between the movable support and the locking member and the indicator lever is achieved by a bearing surface of the movable support cooperating with respective bearing surfaces of the locking member and of the indicator lever.

8. The uplock as claimed in claim 7, wherein the bearing surface of the movable support is held in a first angular position by either of the respective bearing surfaces of the locking member and of the indicator lever when the hook is not locked or the indicator lever is in the first position indicating the absence of the capture pin in the hook, and can only reach a second angular position if the hook is locked and the indicator lever is in the second position indicating the presence of the capture pin in the hook.

* * * * *